(12) United States Patent
Rosenblatt et al.

(10) Patent No.: US 11,748,719 B2
(45) Date of Patent: *Sep. 5, 2023

(54) METHOD AND SYSTEM FOR AUTOMATICALLY COLLECTING PAYMENT FOR A CREDIT ACCOUNT

(71) Applicant: Capital One Services, LLC, McLean, VA (US)

(72) Inventors: Charles A. Rosenblatt, San Francisco, CA (US); Tyler C. Hobbs, Cambridge, MA (US); Frank L. Rotman, Manakin Sabot, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 69 days.

This patent is subject to a terminal disclaimer.

(21) Appl. No.: 17/406,217

(22) Filed: Aug. 19, 2021

(65) Prior Publication Data

US 2021/0383336 A1 Dec. 9, 2021

Related U.S. Application Data

(63) Continuation of application No. 16/232,807, filed on Dec. 26, 2018, now abandoned, which is a
(Continued)

(51) Int. Cl.
*G06Q 20/40* (2012.01)
*G06Q 20/10* (2012.01)
(Continued)

(52) U.S. Cl.
CPC ......... *G06Q 20/102* (2013.01); *G06Q 20/023* (2013.01); *G06Q 20/24* (2013.01); *G06Q 40/02* (2013.01)

(58) Field of Classification Search
None
See application file for complete search history.

(56) References Cited

U.S. PATENT DOCUMENTS

| 5,121,945 A | 6/1992 | Thomson et al. |
| 5,535,407 A * | 7/1996 | Yanagawa ............. G06Q 20/10 705/39 |

(Continued)

FOREIGN PATENT DOCUMENTS

| WO | WO 02/19217 | 3/2002 |
| WO | WO 02/23431 | 3/2002 |
| WO | WO 02/31733 | 4/2002 |

OTHER PUBLICATIONS

Discover Financial Services, "Discover 2GO Card" pp. 1-2, Dec. 19, 2002, www.discover2go.conm.*

(Continued)

*Primary Examiner* — Olabode Akintola
(74) *Attorney, Agent, or Firm* — TROUTMAN PEPPER HAMILTON SANDERS LLP; Christopher J. Forstner; John A. Morrissett (57) ABSTRACT

A method for automatically collecting payment for a credit account includes determining if a credit account is delinquent and determining the number of days the credit account is delinquent. The method includes automatically collecting a first amount from a first account if the number of days the credit account is delinquent comprises at least a first number of days and crediting the credit account the first amount. The first account may comprise a checking account, and the first number of days may comprise twenty days.

20 Claims, 2 Drawing Sheets

Related U.S. Application Data continuation of application No. 14/281,343, filed on May 19, 2014, now Pat. No. 10,163,081, which is a continuation of application No. 10/236,506, filed on Sep. 6, 2002, now Pat. No. 8,762,262.

(51) Int. Cl.
*G06Q 40/02* (2023.01)
*G06Q 20/02* (2012.01)
*G06Q 20/24* (2012.01)

(56) References Cited

U.S. PATENT DOCUMENTS

| | | | |
|---|---|---|---|
| 5,603,529 | A | 2/1997 | Briendel |
| 5,617,568 | A * | 4/1997 | Ault ............... G06F 16/10 |
| 5,933,817 | A | 8/1999 | Hucal |
| 5,953,710 | A | 9/1999 | Fleming |
| 5,978,780 | A | 11/1999 | Watson |
| 6,021,397 | A | 2/2000 | Jones et al. |
| 6,049,784 | A | 4/2000 | Weatherly et al. |
| 6,121,565 | A | 9/2000 | Allot, III |
| 6,158,657 | A | 12/2000 | Hall, III et al. |
| 6,324,524 | B1 | 11/2001 | Lent et al. |
| 6,405,181 | B2 | 6/2002 | Lent et al. |
| 6,961,708 | B1 * | 11/2005 | Bierenbaum ......... G06Q 40/02 715/204 |
| 7,006,994 | B1 * | 2/2006 | Campbell ............ G06Q 20/102 705/40 |
| 8,725,605 | B1 * | 5/2014 | Plunkett ............... G06Q 40/02 705/35 |
| 2001/0037243 | A1 | 11/2001 | Rouston et al. |
| 2001/0042785 | A1 | 11/2001 | Walker et al. |
| 2002/0046065 | A1 | 4/2002 | Nighan |
| 2002/0173994 | A1 | 11/2002 | Ferguson, III et al. |
| 2003/0033245 | A1 | 2/2003 | Kahr |
| 2004/0117302 | A1 | 6/2004 | Weichert |

OTHER PUBLICATIONS

PrepaidShipping.com, *The Online Shipping Solution*, pp. 1-2. http://www.prepaidshipping.com.

PrepaidShipping.com, *The Online Shipping Solution*, pp. 1-2, http://www.prepaidshipping.com/tools/faq.html.

Community Shores Bank, *Checking*, pp. 1-4, http://www.communityshores.com/Checking/checking.html.

PCWorld.com, *Top Tips for Online Banking*, pp. 1-2, http://www.pcworld.corn!features/article/O,aid,I4816,pg,8,00.asp.

Discover Financial Services, "*Discover 2GO Card*," pp. 1-2, Dec. 19, 2002, www.discover2go.com.

Discover Financial Services, "*Discover 2GO Card*," p. I, Dec. 19, 2002, www.discover2go.com/discover/imagesid2go/nonsecuresplashanimation.fif.

* cited by examiner

METHOD AND SYSTEM FOR AUTOMATICALLY COLLECTING PAYMENT FOR A CREDIT ACCOUNT

CROSS-REFERENCE TO RELATED APPLICATIONS

This application is a continuation of, and claims priority under 35 U.S.C. § 120 to, U.S. patent application Ser. No. 16/232,807, filed Dec. 26, 2018, which is a continuation of U.S. patent application Ser. No. 14/281,343, now U.S. Pat. No. 10,163,081, filed May 19, 2014, which is a continuation of U.S. patent application Ser. No. 10/236,506, now U.S. Pat. No. 8,762,262, filed Sep. 6, 2002, the entire contents of which are fully incorporated herein by reference.

FIELD OF THE DISCLOSURE

This invention relates in general to the field of credit account management and, more particularly, to a method and system for automatically collecting payment for a credit account.

BACKGROUND OF THE DISCLOSURE

A credit card issuer, such as a bank or other financial institution, generally provides credit accounts to consumers, or cardholders, allowing the consumers to make purchases on credit rather than using cash. The consumer incurs debt with each credit card purchase which may be repaid over time according to the terms and conditions of the particular consumer's credit account. Credit card accounts provide a consumer with one or more lines of credit, typically including at least one revolving credit line in which the consumer may choose to either pay the full amount of debt owed on his account by a specified date or defer payment of at least a portion of the debt to a later date. The credit card issuer typically charges the consumer interest or finance charges for such deferred payments during the period of deferral.

The credit card issuer typically establishes a credit limit for each credit account defining the maximum amount of credit available to the consumer for making purchases at any given time. When a consumer makes a credit card purchase, the amount of credit available to the consumer, often called the "available balance," is reduced by the amount of the purchase; and the amount of debt currently owed by the consumer, often called the "outstanding balance," is increased by the amount of the purchase.

The credit card issuer typically requires the consumer to pay at least a predetermined minimum amount, often called the "minimum payment amount," by a certain date, often called the "payment due date," in order to maintain the account in good standing. If such minimum payment amount is not paid by the payment due date, then the account typically goes into delinquent or "past due" status. The account may remain in delinquent status until the minimum payment is made. If the account remains in delinquent status for a certain period of time, then the credit card issuer reports the account as delinquent to a credit bureau. Such delinquent reports negatively affect the consumer's ability to receive credit in the future.

SUMMARY OF THE DISCLOSURE

The present invention provides a method and system for automatically collecting payment for a credit account that substantially eliminates or reduces at least some of the disadvantages and problems associated with previous methods and systems.

In accordance with a particular embodiment of the present invention, a method for automatically collecting payment for a credit account includes determining if a credit account is delinquent and determining the number of days the credit account is delinquent. The method includes automatically collecting a first amount from a first account if the number of days the credit account is delinquent comprises at least a first number of days and crediting the credit account the first amount. The first account may comprise a checking account, savings account or other type of account. The first number of days may comprise ten, twenty, thirty or another number of days.

In accordance with another embodiment, a system for automatically collecting payment for a credit account includes a database operable to store information for a credit account. The information may include payment history for the credit account. The system also includes a module operable to determine if the credit account is delinquent and determine the number of days the credit account is delinquent. The module is also operable to automatically collect a first amount from a first account if the number of days the credit account is delinquent comprises at least a first number and credit the credit account the first amount.

Technical advantages of particular embodiments of the present invention include a method for automatically collecting payment for a credit account that automatically collects an amount from a credit account consumer's other account, such as a checking account, when the credit account is delinquent by a certain number of days. Such collection may bring the credit account out of delinquency and avoid a negative report to a credit bureau on behalf of the consumer. This is advantageous because such a report would negatively affect the consumer's credit rating. Thus, the consumer is provided with insurance against negative reports to a credit bureau because of delinquent payments. Furthermore, losses by the credit card issuer may be reduced since the credit account provider will be able to collect a minimum payment before a consumer's credit rating may be further negatively damaged. The credit account provider may also be able to attract more consumers who care about their credit future, or better consumers, by providing this service.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments of the invention and their advantages, reference is now made to the following descriptions, taken in conjunction with the accompanying drawings, in which.

DETAILED DESCRIPTION OF THE EMBODIMENTS

Example embodiments of the present invention and their advantages are best understood by referring now to FIGS. 1 through 4 of the drawings, in which like numerals refer to like parts. In general, a consumer having a credit card account is offered a service in which the issuer of the credit card account automatically collects payment for the account when the consumer is late in making a payment by a certain period of time (i.e., a certain number of days). The automatic collection of payment may prevent a negative report from the credit card issuer to a credit bureau on behalf of the consumer that may negatively affect the consumer's credit rating. The automatic collection of payment may be received from a checking or other type of account of the consumer. Such automatic collection only occurs when the credit card account is delinquent by a certain period of time, for example, in contrast to a regularly scheduled automatic collection of payment (i.e., a monthly payment). Example embodiments of the present invention are described below.

Figure 1:
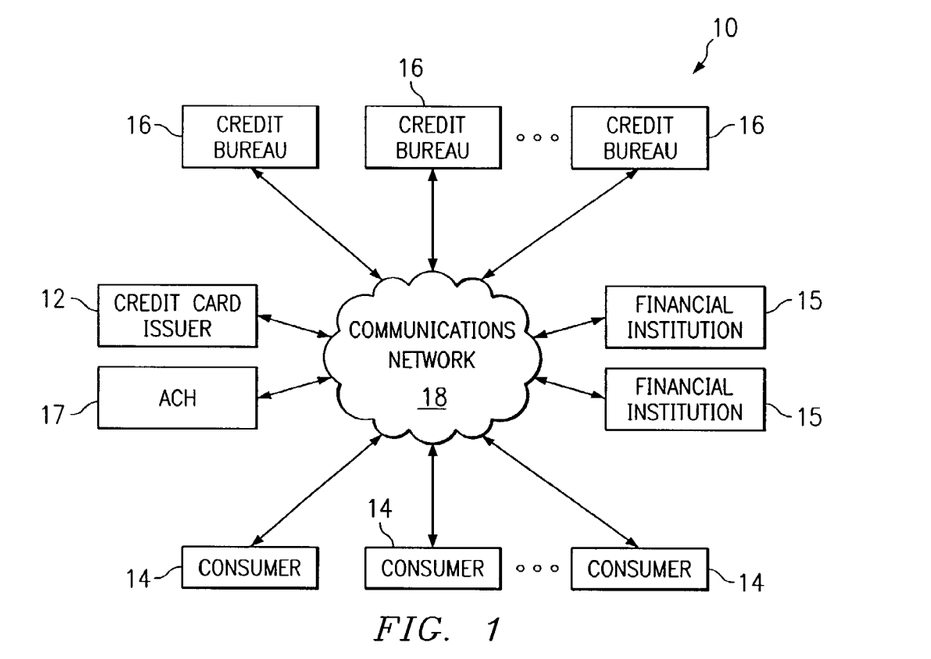
FIG. 1 illustrates an example system for handling credit card accounts, in accordance with an embodiment of the present invention.

FIG. 1 illustrates an example system 10 for handling credit card accounts. System 10 may include a credit card issuer 12, one or more consumers 14, one or more financial institutions 15, one or more credit bureaus 16, and an automated clearinghouse (ACH) 17, all of which may be coupled to each other through a communications network 18. Credit card issuer 12 and consumers 14 may communicate with each other regarding credit card accounts using communications network 18. For example, a consumer 14 may contact credit card issuer 12 using communications network 18 to open a credit card account, make inquiries or requests regarding a credit card account, make payments to credit card issuer 12, or close a credit card account. Credit card issuer 12 may similarly contact consumer 14 to, among other things, offer a credit card to consumer 14, make inquiries regarding recent charges posted to a credit card account, remind consumer 14 of payments due, or notify consumer 14 of the status of a credit card account (i.e., delinquent, good standing, etc.).

Although credit card issuer 12 and consumers 14 are described as communicating with each other using communications network 18, the present invention contemplates any suitable form of communication between credit card issuer 12 and consumers 14. For example, a consumer 14 may communicate with credit card issuer 12 by telephone to make inquiries or requests regarding a credit card account or by mail to make a payment to credit card issuer 12. Similarly, credit card issuer 12 may communicate with a consumer 14 by mail to offer a credit card to consumer 14.

Credit card issuer 12 may communicate with credit bureau 16 using communications network 18 to obtain credit information or to make reports regarding consumers 14, as described more fully below. Credit card issuer 12 may also communicate with financial institution 15 using communications network 18 to collect payments from an account of consumer 14 provided by financial institution 15 through ACH 17, as more fully described below.

A consumer 14 (which may also be referred to as a cardholder 14) may include an individual, a group of individuals, a business organization, or any other suitable entity to which credit card issuer 12 may issue one or more credit cards and/or provide one or more lines of credit. A credit bureau 16 may provide credit information to credit card issuer 12 regarding consumers 14. Credit information may include credit history information, payment information, personal information regarding occupation, income, home ownership, or any other suitable information. In particular embodiments, a credit bureau 16 may include TRANS UNION, EQUIFAX, EXPERIAN, or any other credit bureau. Communications network 18 may, in particular embodiments, include one or more local area networks (LANs), metropolitan area networks (MANs), wide area networks (WANs), portions of the Internet, or any other appropriate wireline, optical, wireless, or other links.

Credit card issuer 12 may include any suitable entity that issues credit cards to consumers 14 and/or provides lines of credit, such as revolving lines of credit, for purchases or other transactions by consumers 14. For example, in particular embodiments credit card issuer 12 may include a merchant or other bank or a credit union. In addition to purchases, such as those described herein, particular embodiments of the present invention contemplate any suitable transactions in which payments may be made using credit cards. For example, a consumer 14 may use a credit card to rent or lease one or more items.

Credit card issuer 12 may issue any suitable credit cards. Such credit cards may include MASTERCARD, VISA, DISCOVER, DINERS CLUB, JCB or other suitable credit cards. Credit cards issued by credit card issuer 12 may include general purpose credit cards (which may be used to purchase a number of different items associated with a number of different industries from a number of different merchants), private label cards (which may be used to purchase only items associated with a particular industry or items from only one or more particular merchants), or both. Although cards are particularly described herein, particular embodiments of the present invention contemplate, in addition to credit card accounts having associated cards issued to consumers 14, credit accounts that do not have associated cards. For example, credit card issuer 12 may open a credit account for a consumer having an associated credit account number but no associated card. Consumer 14 may then purchase items on credit using the associated credit account number. Reference to "credit cards" or "credit card accounts" may, where appropriate, encompass such credit accounts.

Credit card issuer 12 may manage credit card accounts, which may include opening credit card accounts for consumers 14, monitoring credit card accounts, billing consumers 14, collecting payments from consumers 14 or other sources (such as a bank account of a consumer 14), receiving and handling inquiries and requests from consumers 14 regarding credit card accounts, and closing credit card accounts. In particular embodiments, as described more fully below, opening a credit card account for a consumer 14 may include establishing a line of credit according to credit information from credit bureau regarding consumer 14, information obtained from consumer 14 directly, one or more evaluations of payments received from consumer 14, or other suitable information; establishing one or more terms of a credit card account agreement between credit card issuer 12 and consumer 14; and activating one or more services which credit card issuer 12 may provide to consumer 14 in connection with the credit card account. In accordance with one such service, the credit card issuer 12 automatically collects payment from a consumer's checking account when the consumer's credit card account is a certain number of days delinquent, as further described below.

Financial institution 15 may include any suitable entity, such as a bank, that provides to consumers 14 accounts which may contain funds used to make a payment to credit card issuers 12 to be credited to a credit card or other credit account of consumer 14. Such accounts provided by financial institution 15 may include checking, savings, investment, or other suitable accounts. Alternatively, such accounts may include a line of credit provided to consumer 14 by a credit card issuer other than credit card issuer 12. The funds held in such accounts provided by financial institution 15 may be deposited directly by consumer 14, automatically by a debtor of consumer 14 or through other means.

ACH 17 is a system through which various entities, such as credit card issuers 12 and financial institutions 15, may transfer funds. Payments for a particular consumer's credit card account may be collected by credit card issuer 12 from another account of the consumer provided by financial institution 15. In particular embodiments, such collection of payment may occur automatically through ACH 17. For example, after an authorization by a consumer 14, credit card issuer 12 may request payment, through ACH 17, for the consumer's credit card account from a checking account of the consumer provided by financial institution 15. After clearance by ACH 17, the payment from the consumer's account at financial institution 15 is transferred to and received by credit card issuer 12 through ACH 17 to be credited to the credit card account of the consumer.

Figure 2:
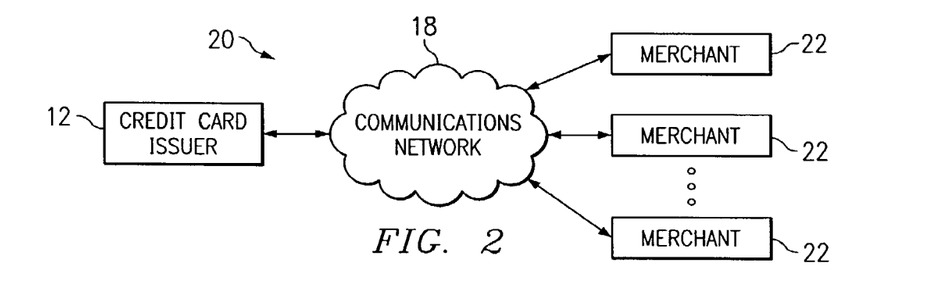
FIG. 2 illustrates an example system for handling transactions in which payments are made using credit cards, in accordance with an embodiment of the present invention.

FIG. 2 illustrates an example system 20 for handling transactions in which payments are made using credit cards. System 20 may include credit card issuer 12 and one or more merchants 22, which may be coupled to each other by communications network 18. A merchant 22 may include any suitable entity that sells items to cardholders and may include a single entity (such as, for example, an individual store) or a number of entities (such as, for example, a chain of stores). A merchant 22 may include a seller or distributor that sells items produced by one or more otherwise unaffiliated producers. In addition or as an alternative, merchant 22 may include a producer that sells one or more items it produces directly to cardholders, bypassing distributors.

Merchant 22 may include one or more outlets at one or more physical locations and may, in addition or as an alternative, include one or more call centers where phone orders are received from cardholders, one or more websites or other virtual locations where electronic orders are received from cardholders, or one or more warehouses (which may be owned by merchant 22 or owned by one or more entities distinct from merchant 22 for which merchant 22 sells items to cardholders) where orders received from cardholders are filled. Payment may be made for items provided by merchant 22 using a general purpose card, private label card, or any other suitable credit card.

Although merchants 22 are described as selling items to consumers 14, particular embodiments of the present invention, as described above, contemplate any suitable transactions between merchants 22 and consumers 14. As an example, a merchant 22 may rent or lease one or more items to a consumer 14. As another example, a merchant 22 may provide one or more services to a consumer 14.

Communications network 18 supporting communication between credit card issuer 12 and merchant 22 may include, as described above, one or more local area networks (LANs), metropolitan area networks (MANs), wide area networks (WANs), portions of the Internet, or any other appropriate wireline, optical, wireless, or other links. Communications network 18 may, where appropriate, include one or more private networks used exclusively for communication between credit card issuer 12 and one or more particular merchants 22. This may be the case where, for example, credit card issuer 12 provides lines of credit to consumers 14 to purchase items only at one or more particular merchants 22. Although credit card issuer 12 and merchants 22 are described as distinct entities, in particular embodiments, credit card issuer 12 and one or more merchants 22 may be part of a single organization. In particular embodiments, credit card issuer 12 may include one or more merchants 22. Moreover, in particular embodiments, one or more merchants 22 may include credit card issuer 12.

A consumer 14 may purchase items from a merchant 22 in any suitable manner. As an example, consumer 14 may purchase items from merchant 22 at a store or other physical location operated by merchant 22. As another example, consumer 14 may purchase items from merchant 22 over the telephone, by mail, or using the Internet or other suitable communications network (which may be similar to communications network 18). Purchased items may be subsequently shipped to consumer 14 after such purchase. When a consumer 14 purchases one or more items from a merchant 22, merchant 22 may generate an electronic record of the transaction and communicate the generated record to credit card issuer 12. A transaction record may be generated in any suitable manner, such as at a point-of-sale terminal or other device, and may include any suitable transaction data. For example, a transaction record may include data reflecting a credit card number (or, as described above, a credit account number), data reflecting a transaction price, data identifying merchant 22, and data reflecting a transaction date. Credit card issuer 12 may use the communicated transaction record to update the credit card account of consumer 14 for billing and other purposes.

Figure 3:
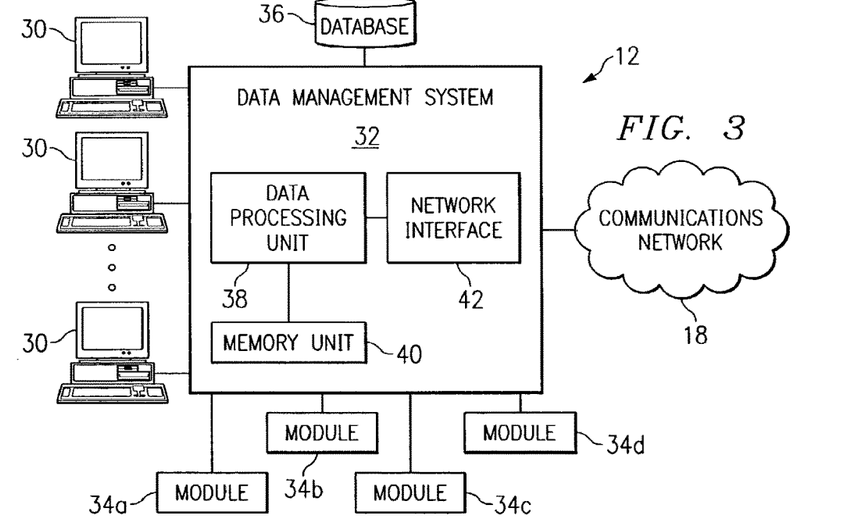
FIG. 3 illustrates an example credit card issuer, in accordance with an embodiment of the present invention.

FIG. 3 illustrates an example credit card issuer 12. Credit card issuer 12 may include one or more operator terminals 30, a data management system 32, one or more function modules 34, and a database 36. The components of credit card issuer 12 may be located at a single site or, alternatively, at a number of different sites. The components of credit card issuer 12 may be coupled to each other using one or more links, each of which may include one or more computer buses, local area networks (LANs), metropolitan area networks (MANs), wide area networks (WANs), portions of the Internet, or any other appropriate wireline, optical, wireless, or other links. An operator terminal 30 may provide an operator access to data management system 32 to configure, manage, or otherwise interact with data management system 32. An operator terminal 30 may comprise a computer system (which may include one or more suitable input devices, output devices, processors and associated memory, mass storage media, communication interfaces, and other suitable components) or other suitable device.

Data management system 32 may manage data associated with credit card accounts, which may in particular embodiments include creating, modifying, and deleting data files associated with credit card accounts automatically or in response to data received from one or more operator terminals 30, function modules 34, or consumers 14. Additionally, data management system 32 may call one or more function modules 34 to provide particular functionality according to particular needs, as described more fully below. Data management system 32 may include a data processing unit 38, a memory unit 40, a network interface 42, and any other suitable components for managing data associated with credit card accounts. The components of data management system 32 may be supported by one or more computer systems at one or more sites. One or more components of data management system may be separate from other components of data management system 32; and one or more suitable components of data management system 32 may, where appropriate, be incorporated into one or more other suitable components of data management system 32.

Data processing unit 38 may process data associated with credit card or other credit accounts, which may include executing coded instructions (which may in particular embodiments be associated with one or more function modules 34). Memory unit 40 may be coupled to data processing unit 38 and may include one or more suitable memory devices, such as one or more random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EEPROMs), microcontrollers, or microprocessors. Network interface 42 may provide an interface between data management system 32 and communications network 18, such that data management system 32 may communicate with consumers 14, credit bureaus 16, and merchants 22.

Database 36 is a storage vehicle for credit card issuers 12. Database 36 may include various information relating to credit card or other accounts provided or issued by credit card issuers 12. Such information may include account balances, payment due dates and other payment information, account history, consumer information, or any other suitable information stored by credit card issuers 12.

A function module 34 may provide particular functionality associated with handling credit card accounts or handling transactions in which payments are made using credit cards. For example, in particular embodiments, a function module 34 may provide functionality associated with risk profiling, service interest, service enrollment, credit card account management, billing, or collection. A function module 34 may be called by data management system 32 (possibly as a result of data received from an operator terminal 30 or a consumer 14 via communications network 18) and, in response, may provide the particular functionality associated with the function module and communicate one or more results to data processing unit 38 or one or more other suitable components of data management system 32. Data management system 32 may then use the communicated results to create, modify, or delete one or more data files associated with one or more credit card accounts, provide data to an operator at operator terminal 30 or consumer 14, or perform any other suitable task. Function modules 34 may be physically distributed such that each function module 34, or multiple instances of each function module 34, may be located in physical locations geographically remote from each other and/or from data management system 32.

In the embodiment shown in FIG. 3, function module 34a is used to collect, interrogate, analyze, calculate, and/or manipulate information regarding accounts, including account balances, account history, minimum payment due, due date, and any other account information. More particularly, function module 34a is used to determine if a particular consumer's credit card account is delinquent. Such determination may be made by querying database 36 which holds such consumer's account information. Function module 34a may also determine the number of days the consumer's credit card account is delinquent (i.e., the number of days which have lapsed since the consumer's payment due date by which minimum payment was not received). Function module 34a may also automatically collect payment from another account of the consumer, such as a checking account provided by another financial institution, if the consumer's credit card account is delinquent by a certain number of days. Such number of days which may trigger the automatic collection of payment from the consumer's other account may be ten, twenty, thirty, or any other number of days. The consumer's other account from which automatic collection is made may be a bank account (i.e., a checking, savings, or investment account) or any other type of account provided by a financial institution or otherwise. The automatic collection of payment may occur through an automated clearinghouse. Function module 34a credits the consumer's credit card account by the amount automatically collected from the consumer's other account to bring the consumer's credit card account out of its delinquent status. The automatic collection of payment from the consumer's other account and subsequent credit to the consumer's credit card account avoids a negative report or "hit" by the credit card issuer to a credit bureau on behalf of the consumer for having a past due or delinquent account for a certain period of time. For example, in some embodiments a credit card issuer must make a negative report to a credit bureau on behalf of a consumer when the consumer's credit card account is delinquent for thirty days. In such cases, the automatic collection of payment may be made whenever the consumer's credit card account has been delinquent for a period of time less than thirty days (i.e., twenty days), in order to avoid the negative report to the credit bureau. The functions performed by function module 34a may be performed separately or in groups by any other number of function modules 34.

In particular embodiments, the automatic collection of payment from the consumer's other account is not undertaken on a recurring basis because when the automatic collection of payment occurs during the time in which the consumer's credit card account is delinquent, it brings the consumer's credit card account out of its delinquent status for the delinquent period plus the current period. For example, if function module 34a automatically debits a consumer's checking account after the consumer's credit card account was delinquent for thirty days, then at the end of such thirty days the consumer's credit card account would be in good standing. Furthermore, if the consumer then had a thirty-day period in which to make the next payment (thirty days before the next payment due date), then an automatic collection of payment for having an account thirty days delinquent could not occur for another sixty days since the consumer would have thirty days until the next payment was due followed by another thirty day period before such automatic collection of payment occurs. Thus, particular embodiments of the present invention provide an automatic collection of payment for a consumer's credit card account that occurs on a non-recurring basis. This is in contrast to a typical recurring basis automatic collection of payment which, for example, may debit a consumer's bank account every month.

Credit card issuer 12 may offer the automatic collection of payment when an account is delinquent by a certain time period as a service in exchange for awards, such as points, airline miles, credit line increases, or interest rate or fee reductions. A consumer may enroll in this service when the consumer opens the credit card account or after having the credit card account for a period of time. A fee could also be charged for providing this service to consumers. The service may be provided for credit card issuer 12 at different times, for example, when a consumer fails to meet a payment due date. The service may also be provided to a particular type of consumer, for example, a consumer who has a negative credit history and is therefore deemed more likely to miss payment due dates.

Automatically collecting payment in this manner provides the consumer with insurance against negative reports to a credit bureau because of delinquent payments. Furthermore, losses by the credit card issuer may be reduced since the credit card issuer will be able to collect a minimum payment before a consumer's credit rating may be further negatively damaged. The credit card issuer may also be able to attract more consumers who care about their credit future, or better consumers, by providing this service.

Figure 4:
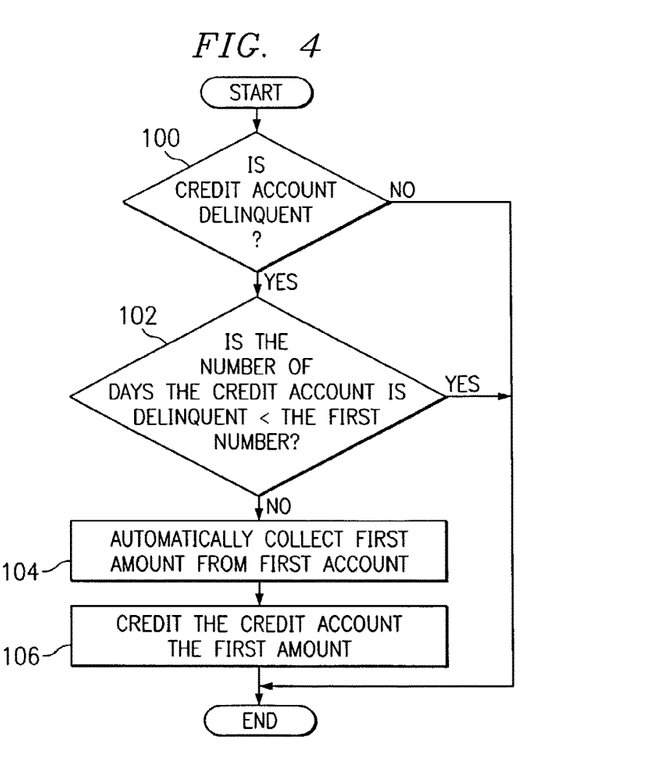
FIG. 4 illustrates a method for automatically collecting payment for a credit account, in accordance with a particular embodiment of the present invention.

FIG. 4 is a flow chart illustrating a method for automatically collecting payment for a credit account, in accordance with a particular embodiment of the present invention. The method begins at step 100 with determining if a particular credit account is delinquent. The credit account may be provided by a credit card issuer (i.e., VISA, MASTER-CARD, AMERICAN EXPRESS, DINERS, etc.). In particular embodiments, a credit account is delinquent when the holder, or consumer, of the credit account fails to make a minimum payment by a payment due date. At step 102, the number of days the credit account is delinquent is determined. Such number of days may comprise the number of days which have lapsed since the holder's payment due date by which the minimum payment was not received.

At step 104, a first amount is automatically collecting from a first account if the number of days the credit account is delinquent comprises at least a first number. The first amount may comprise a minimum payment amount, a previously designated amount or another amount. The first amount may comprise a sufficient amount to bring the credit account out of delinquency. The first number may comprise ten, twenty, thirty or another number. For example, in particular embodiments, the first amount may be automatically collected if the credit account has been delinquent at least twenty days. The first account from which the first amount is automatically collected may comprise a checking, savings, investment, or other type of account of the holder of the credit account. Automatically collecting the first-amount from the first account may comprise requesting the first amount from a provider of the first account, such as a financial institution, through an automated clearinghouse network and receiving the first amount from the provider of the first account through the automated clearinghouse network.

At step 106, the credit account is credited the first amount. Such credit prevents the provider of the credit account (a credit card issuer in particular embodiments) from having to make a negative report or "hit" to a credit bureau on behalf of the holder of the credit account. In some embodiments, the credit account provider may notify the consumer that the first amount was debited from the first account and that the credit account was credited such amount.

Although the present invention has been described in detail, various changes and modifications may be suggested to one skilled in the art. It is intended that the present invention encompass such changes and modifications as falling within the scope of the appended claims.

What is claimed is:

1. A computer implemented method for automatically collecting payment for a credit account, comprising:
   receiving, via a graphical user interface (GUI), an indication from a consumer to request automatic payment of the credit account when the credit account is delinquent;
   processing the request by modifying data associated with the credit account in a database;
   linking the credit account associated with the consumer to a first account associated with the consumer in the database by modifying the data associated with the credit account in the database to include additional data regarding the first account;
   iteratively updating the data associated with the credit account in the database according to a transaction record of an issuer of the credit account, the transaction record comprising purchases associated with the consumer;
   iteratively determining a status of the credit account using a processor that tracks a number of days having lapsed since the credit account received at least a minimum payment during a predetermined period of time by querying the data in the database associated with the credit account;
   responsive to determining the status of the credit account corresponds to a delinquent status during the predetermined period of time:
      modifying the data associated with the credit account in the database to reflect the delinquent status;
      providing, via the GUI, the consumer with a first status indicator by reading the data associated with the credit account in the database labeling the credit account as delinquent;
      automatically requesting from a provider of the first account, an amount sufficient to resolve the delinquent status of the credit account via automated clearinghouse transfer;
      crediting the amount to the credit account from the first account;
      modifying the data associated with the credit account in the database to reflect a good standing status; and
      providing, via the GUI, the consumer with a second status indicator replacing the first status indicator by reading the data associated with the credit account in the database labeling the credit account in good standing.

2. The method of claim 1, further comprising:
   determining an enrollment status associated with the credit account using a processor that tracks one or more conditions associated with offering consumer enrollment;
   responsive to the processor identifying that at least one of the one or more conditions is satisfied:
      applying to the credit account at least one award selected from points, rewards, airline miles, a credit line increase, an interest rate deduction, or a fee reduction; and
      providing, via the GUI, the consumer with a third status indicator identifying the at least one applied award.

3. The method of claim 2, wherein a first condition of the one or more conditions associated with offering consumer enrollment comprise identifying that the first account was opened within a predetermined amount of time.

4. The method of claim 2, wherein a first condition of the one or more conditions associated with offering consumer enrollment comprises identifying that the first account has been open longer than a predetermined amount of time.

5. The method of claim 2, wherein the one or more conditions associated with offering consumer enrollment comprise a delinquent first account status or the consumer having a negative credit rating.

6. The method of claim 1, wherein linking the credit account to the first account in the database comprises at least one action selected from creating, modifying, or deleting one or more data files.

7. The method of claim 1, wherein the amount comprises a minimum payment amount or a previously designated payment amount.

8. The method of claim 1, wherein crediting the amount from the first account comprises requesting the amount from the provider of the first account through an automated clearinghouse network, and receiving the amount from the provider of the first account through the automated clearinghouse network.

9. The method of claim 1, notifying the consumer that the first account was debited the amount and that the credit account was credited the amount with a third status indicator via the GUI.

10. A system for automatically collecting payment for a credit account, comprising:
one or more processors;
a memory in communication with the one or more processors, and storing instructions, that when executed by the one or more processors, are configured to cause the system to:
receive, via a graphical user interface (GUI), a request from a consumer enabling automatic payment of the credit account when the credit account is delinquent;
process the request by modifying data associated with the credit account in a database;
link the credit account associated with the consumer to a first account associated with the consumer in the database by modifying the data associated with the credit account in the database to include additional data regarding the first account;
iteratively update the data associated with the credit account in the database according to a transaction record of an issuer of the credit account, the transaction record comprising purchases associated with the consumer;
iteratively monitor a status of the credit account by tracking, via the one or more processors, a number of days having lapsed since the credit account received at least a minimum payment during a predetermined period of time by querying the data in the database associated with the credit account;
responsive to determining the status of the credit account corresponds to a delinquent status during the predetermined period of time:
modify the data associated with the credit account in the database to reflect the delinquent status;
provide, via the GUI, the consumer with a first status indicator by reading the data associated with the credit account in the database labeling the credit account as delinquent;
automatically request from a provider of the first account, an amount sufficient to resolve the delinquent status of the credit account;
credit the amount to the credit account from the first account;
modify the data associated with the credit account in the database to reflect a good standing status; and
provide, via the GUI, the consumer with a second status indicator replacing the first status indicator by reading the data associated with the credit account in the database labeling the credit account in good standing.

11. The system of claim 10, wherein the memory includes instructions that, when executed by the one or more processors are configured to cause the system to:
determine an enrollment status associated with the credit account by tracking, via the one or more processors, one or more conditions associated with offering consumer enrollment;
responsive to the one or more processors identifying that at least one of the one or more conditions is satisfied:
apply to the credit account at least one award selected from points, rewards, airline miles, a credit line increase, an interest rate deduction, or a fee reduction; and
provide, via the GUI, the consumer with a third status indicator identifying the at least one applied award.

12. The system of claim 11, wherein a first condition of the one or more conditions associated with offering consumer enrollment comprise identifying that the first account was opened within a predetermined amount of time.

13. The system of claim 11, wherein a first condition of the one or more conditions associated with offering consumer enrollment comprises identifying that the first account has been open longer than a predetermined amount of time.

14. The system of claim 11, wherein the one or more conditions associated with offering consumer enrollment comprise a delinquent first account status or the consumer having a negative credit rating.

15. The system of claim 10, wherein linking the credit account to the first account in the database comprises at least one action selected from creating, modifying, or deleting one or more data files.

16. The system of claim 10, wherein the amount comprises a minimum payment amount or a previously designated payment amount.

17. A computer implemented method for automatically collecting payment for a credit account, comprising:
providing, via a first graphical user interface (GUI), a consumer an option to request automatic payment of the credit account associated with the consumer by one of a plurality of first accounts when the credit account is delinquent;
responsive to receiving a response enabling automatic payment of the credit account when the credit account is delinquent via the first GUI, processing the request by modifying data associated with the credit account in a database;
linking the credit account to the plurality of first accounts in the database by modifying the data associated with the credit account in the database to include additional data regarding the plurality of first accounts;
iteratively updating the data associated with the credit account in the database according to a transaction record of an issuer of the credit account, the transaction record comprising purchases associated with the consumer;
iteratively determining a status of the credit account using a processor that tracks a number of days having lapsed since the credit account received at least a minimum payment during a predetermined period of time by querying the data in the database associated with the credit account;
responsive to determining the status of the credit account corresponds to a delinquent status during the predetermined period of time:
modifying the data associated with the credit account in the database to reflect the delinquent status;

providing, via a second GUI, the consumer with a first status indicator by reading the data associated with the credit account in the database labeling the credit account as delinquent;

determining a primary account of the plurality of first accounts based on tracking, using the processor by querying the data in the database associated with the credit account, account balances associated with each of the plurality of first accounts, the primary account having a highest account balance of the plurality of first accounts;

preselecting, via the second GUI, an indication of the primary account to resolve the delinquent status of the credit account by reading the data associated with the credit account in the database;

automatically requesting from a provider of the primary account, an amount sufficient to resolve the delinquent status of the credit account;

crediting the amount to the credit account from the primary account;

modifying the data associated with the credit account in the database to reflect a good standing status; and providing, via the second GUI, the consumer with a second status indicator replacing the first status indicator by reading the data associated with the credit account in the database labeling the credit account in good standing.

18. The method of claim 17, wherein linking the credit account to the plurality of first accounts in the database comprises at least one action selected from creating, modifying, or deleting one or more data files.

19. The method of claim 17, further comprising:
determining an enrollment status associated with the credit account using a processor that tracks one or more conditions associated with offering consumer enrollment;
responsive to the processor identifying that at least one of the one or more conditions is satisfied:
applying to the credit account at least one award selected from points, rewards, airline miles, a credit line increase, an interest rate deduction, or a fee reduction; and
providing, via the GUI, the consumer with a third status indicator identifying the at least one applied award.

20. The method of claim 19, wherein the one or more conditions associated with offering consumer enrollment comprise a delinquent first account status or the consumer having a negative credit rating.

* * * * *